Oct. 18, 1960 R. G. QUICK 2,956,492
PHOTOELECTRICALLY CONTROLLED DEVICES
Filed June 6, 1956 4 Sheets-Sheet 1
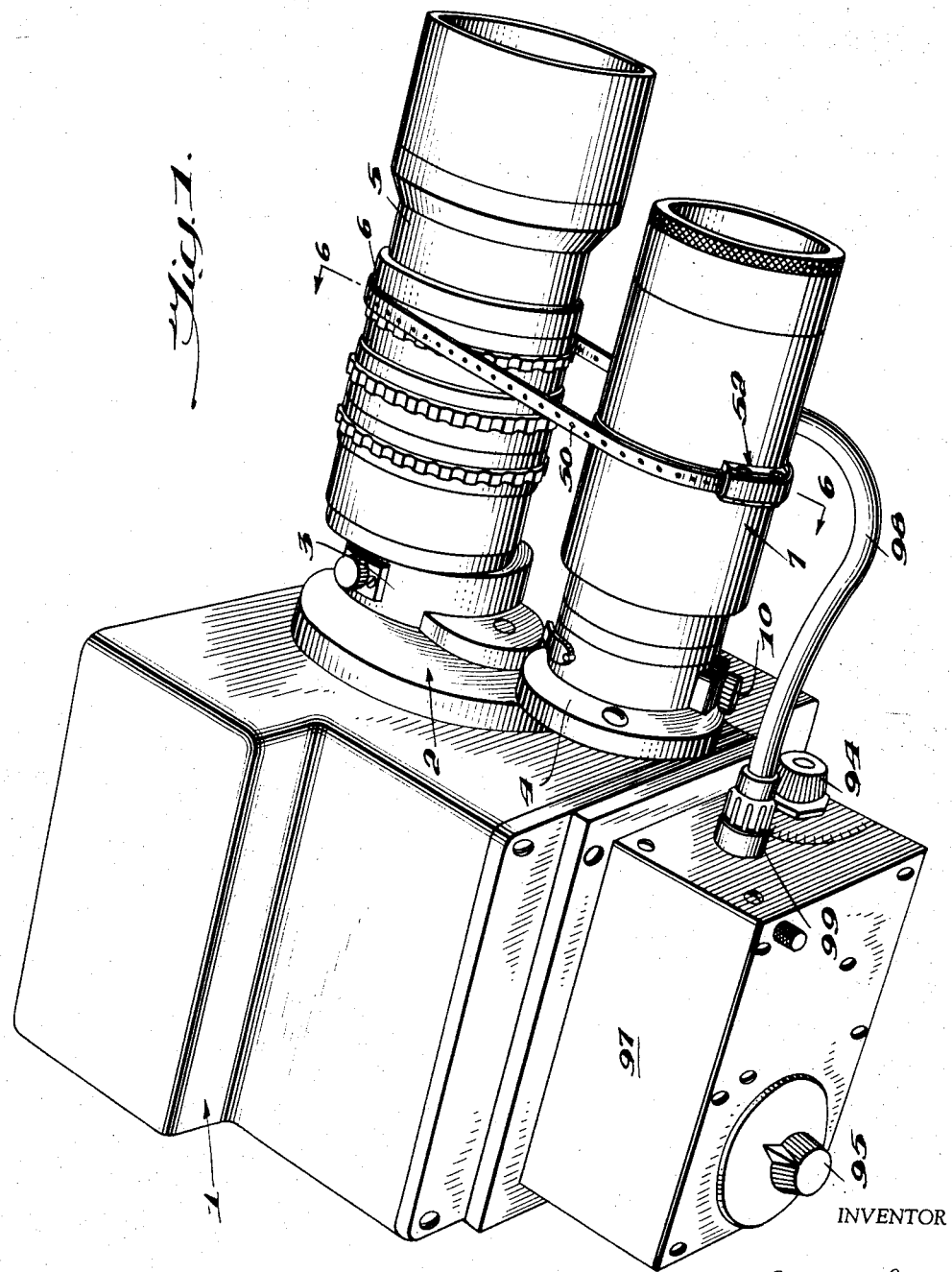
INVENTOR
Robert G. Quick,
BY Stone, Boyden & Mack,
ATTORNEYS

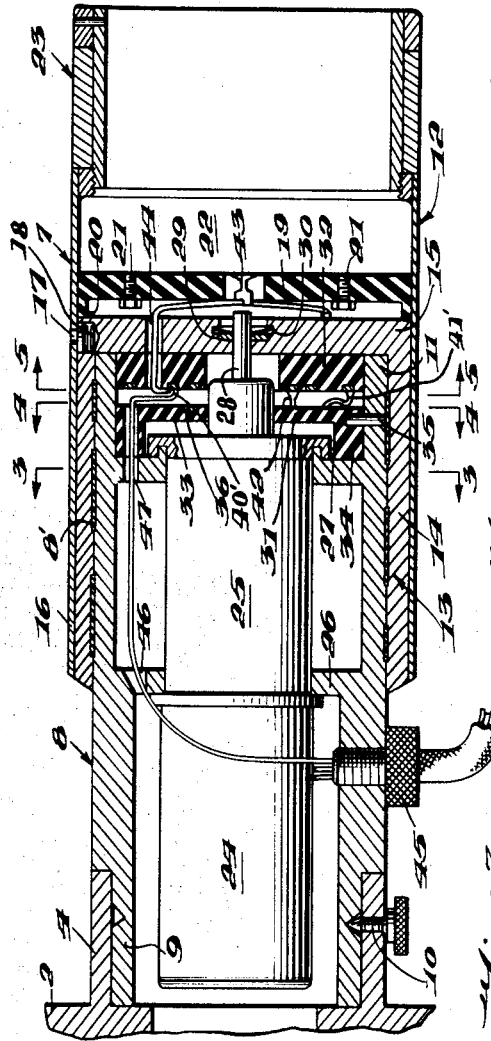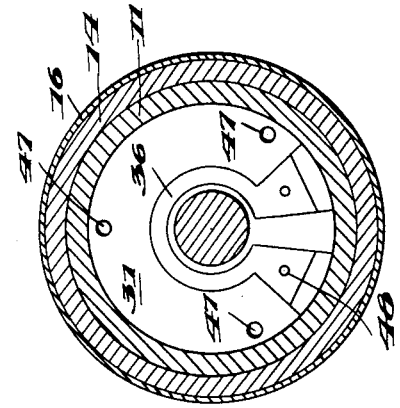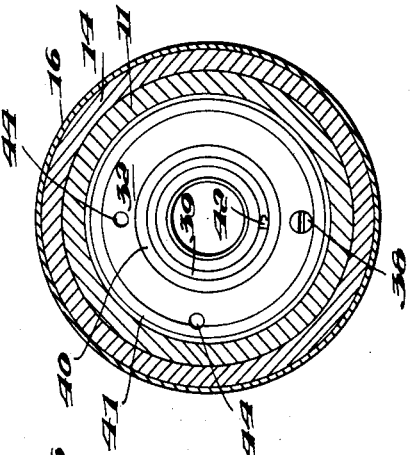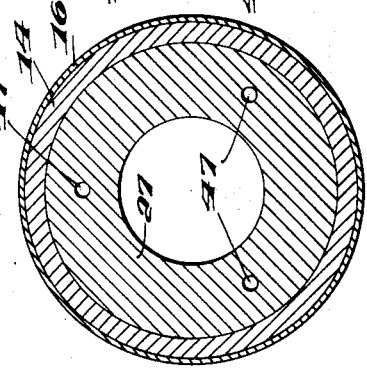

Oct. 18, 1960 R. G. QUICK 2,956,492
PHOTOELECTRICALLY CONTROLLED DEVICES
Filed June 6, 1956 4 Sheets-Sheet 3
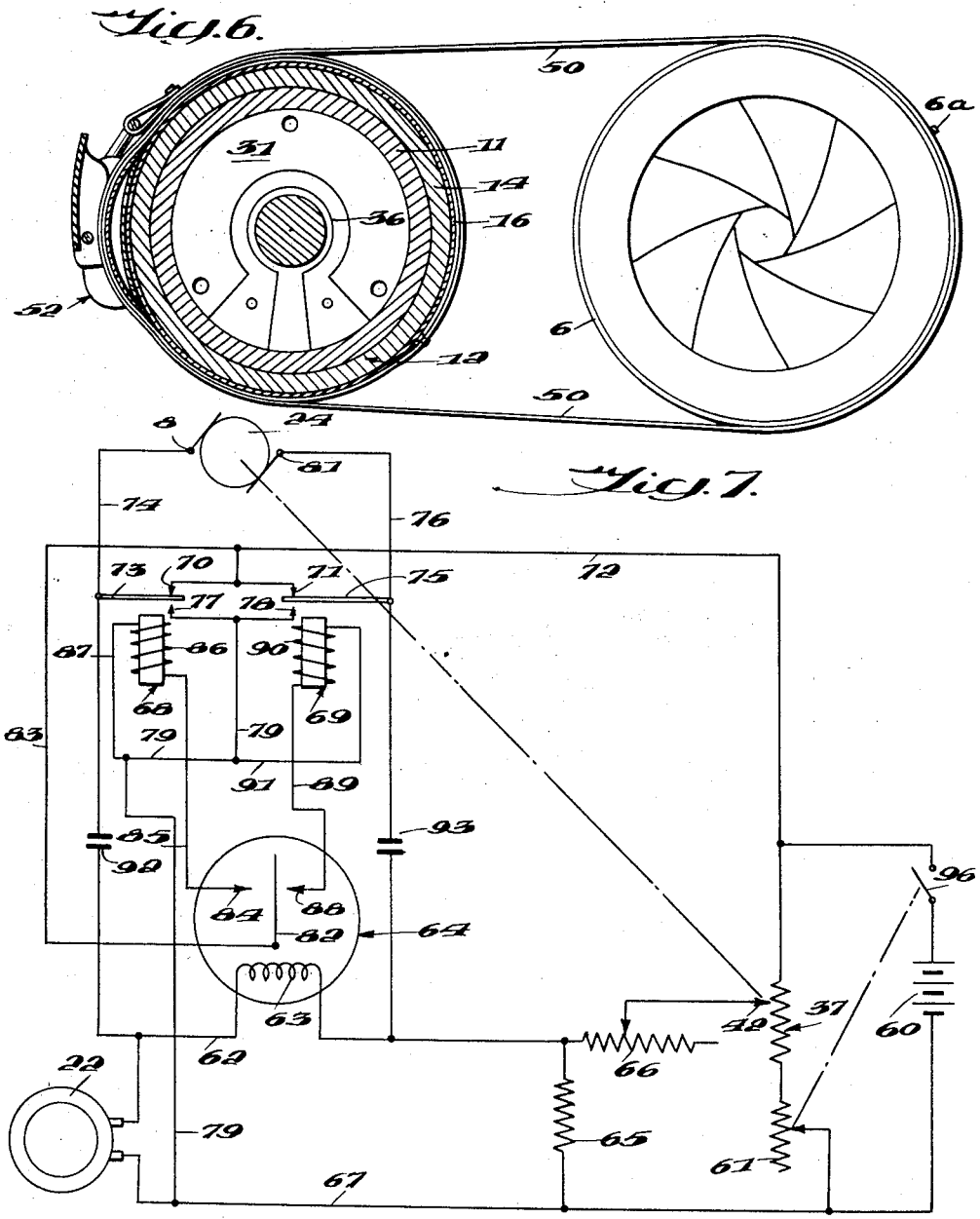
INVENTOR
Robert G. Quick,
BY Stone, Boyden & Mack,
ATTORNEYS.

Fig. 8.

United States Patent Office 2,956,492
Patented Oct. 18, 1960

2,956,492
PHOTOELECTRICALLY CONTROLLED DEVICES

Robert G. Quick, Richmond, Va., assignor to Flight Research, Incorporated, a corporation of Virginia Filed June 6, 1956, Ser. No. 589,649

2 Claims. (Cl. 95—64)

This invention relates to photoelectrically controlled devices and more particularly to such devices capable of imparting rotary motion to a member to be adjusted.

Many attempts have been made in the past to develop a photoelectrically controlled mechanism which would be practical for imparting a precise amount of rotary motion to a rotatable member in response to variations in light. One of the primary applications for such a device is the automatic actuation of a camera aperture adjusting ring in response to changes in light viewed by the camera. Automatic camera aperture adjusting systems are useful, for example, where the camera is automatically operated, as in recording data at remote stations, or where the camera successively views scenes so differently illuminated as to require resetting of the aperture, as in commercial motion picture photography, the use of television newsreel cameras, military documentation and combat photography.

Prior-art automatic camera aperture adjusting devices have presented numerous disadvantages. First, they have been generally unsuccessful in providing means which are capable of accurately effecting the desired adjustment with the relatively small amount of power available in a camera-attached device responding to the low light levels at which modern films are operable. Another difficulty has been found in devising a mechanism which is readily adaptable to the many available types of cameras and, particularly, to the different sizes of lens tubes ordinarily employed.

The present invention provides a greatly improved photoelectrically controlled device capable of imparting a precise adjustment to a rotary element. A particular advantage of the invention is the provision of such a device which, when used in combination with a conventional camera having interchangeable lens tubes of different sizes, is very quickly adjustable to cooperate with the particular lens tube being employed. A further advantage of the device of the present invention is its adjustability to compensate for the different relationships between aperture size and aperture ring travel met with when dealing with different lens tubes. Another advantage of the invention is its ability to effect precise and positive rotational adjustments while requiring only a relatively small amount of power. Still further, the invention provides a photoelectrically controlled device which is small, compact and relatively inexpensive to manufacture, with the working parts being sealed against dirt and foreign matter.

In order that the invention may be understood in detail, reference is had to the accompanying drawings, which form a part of this specification, and wherein:

Fig. 1 is a perspective view of one embodiment of the invention applied to a conventional camera to accomplish automatic adjustment of the aperture ring thereof;

Fig. 2 is a longitudinal sectional view through the main assembly of the embodiment of the invention seen in Fig. 1;

Fig. 3 is a transverse sectional view taken on the line 3—3, Fig. 2;

Fig. 4 is a transverse sectional view taken on the line 4—4, Fig. 2;

Fig. 5 is a transverse sectional view taken on the line 5—5, Fig. 2;

Fig. 6 is a sectional view taken on the line 6—6, Fig. 1;

Fig. 7 is a schematic diagram of the electrical circuit employed in the device of Fig. 1, and Fig. 8 is a front elevational view of another embodiment of the invention, applied to a camera having a turret with three lens mounts.

Referring now to the drawings in detail, it will be seen that this embodiment of the invention is applied to a conventional moving picture camera 1 having a front plate 2 provided with the usual lens mount 3 and, adjacent thereto, a similar mount 4. Mounted on lens mount 3 is a conventional lens tube 5 including an aperture adjusting ring 6. Mounted on the added mount 4, and extending forwardly parallel to the lens tube 5, is the main unit 7 of the photoelectrically controlled aperture ring adjusting mechanism.

As seen in Figs. 2–5, the unit 7 comprises a housing 8 having at one end a cylindrical base portion 9 constructed to cooperate with the mount 4. Base portion 9 fits snugly within annular mount 4 and is provided with an annular, transverse groove cooperating with the conventional locking means 10. At the other end, the housing 8 is provided with a cylindrical tip 11. Rotatably mounted on the tip 11 of housing 8 is a drive assembly 12 comprising a cup-like member 13 having a cylindrical tubular portion 14 and a transverse circular wall 15. The cylindrical tubular portion 14 of the member 13 rotatably embraces the cylindrical tip portion 11 of the housing 8. To reduce friction between housing 8 and member 13, a length of polytetrafluoroethylene tape 8' is helically wound on the outer surface of member 8 to act as a plain anti-friction bearing.

Snugly embracing member 13 is a tubular sleeve 16 which extends forwardly beyond the circular wall 15 of member 14. To secure sleeve 16 in place, a locking stud 17, seated in a radially disposed bore in member 13, and urged outwardly by means of a compression spring 18, engages a cooperating aperture in sleeve 16. Fitted snugly within sleeve 16 and positioned adjacent to wall 15 of member 13 is a circular mounting plate 19 of suitable electrical insulating material, the plate 19 being provided on its back face with an annular flange 20 serving to maintain the plate 19 spaced forwardly somewhat from wall 15 of member 13. Mounted on the forward face of plate 19, as by mounting bolts 21, is a conventional photoelectric cell, or other suitable photo-voltaic device, 22. It will be noted that the photoelectric cell 22 is generally cylindrical in form, its casing fitting snugly within sleeve 16, the cell being so positioned as to be exposed to the scene viewed through lens tube 5. That is, the photoelectric cell 22 receives light travelling axially toward the rotatable drive member 12. Attached to the forward tip of sleeve 16 in any suitable manner is a sunshade assembly 23.

Mounted within housing 8 is a power unit comprising a miniature direct current electric motor 24 and a gear reduction box 25. This unit is mounted by means of inwardly extending annular shoulders 26 and 27 formed integrally with the housing 8. The output shaft 28 of the power unit is disposed coaxially with the cylindrical tip of housing 8 and extends through wall 15 of member 13. A driving connection is established between the output shaft 28 and member 14 by a conventional slip clutch comprising friction member 29 and annular, cup-shaped clutch spring 30. Thus, actuation of motor 24 rotates the rotatable assembly 12.

In the space defined by shoulder 27 and wall 15 are disposed members 31 and 32 of electrical insulating material. The member 31 includes a circular base portion 33 and a rearwardly extending annular flange 34 and is secured to wall 27 by means of a radially extending pin 35, Fig. 2. On its forward face, the member 31 is provided with a generally annular recess in which is disposed the resistance element 36 of a potentiometer 37, Fig. 7.

The member 32 is in the nature of an annular disc mounted on wall 15, as by means of a screw 38, Fig. 5. On its rearwardly disposed face, the member 32 is provided with three concentrically disposed, rhodium-plated copper contact rings 39, 40 and 41, these rings being mounted in annular recesses in the member 32 and being spaced from one another so as to be electrically isolated. Secured to the innermost contact ring 39 is a sliding contact 42, the contact 42 extending rearwardly of the assembly into engagement with the resistance element 36 of potentiometer 37. Thus, as the assembly 12 is rotated as a result of actuation of motor 24, the member 32 is also rotated so that contact 42 travels along resistance element 36, it being understood that the member 31, being attached to housing 8, remains stationary.

The remaining contact rings 40 and 41 are employed to provides electrical connections to the two terminals 43, Fig. 2, of the photoelectric cell 22. Suitable bores 44 extend through members 15 and 32 to accommodate electrical conductors having their ends soldered respectively to the contacts 43 and the contact rings 40, 41. A conventional electrical adaptor 45, Fig. 2, is provided to lead the necessary electrical conductors into the housing 8. Certain of these conductors are connected to supply the motor 24 with current, while others of the conductors are led through suitably disposed bores 46, in shoulder 26, and 47, in shoulder 27 and member 31. Such other conductors are connected to sliding contacts engaging the contact rings 39—41 and to the end terminals 48 of resistance element 36.

Since the assembly 12 is rotated as a result of actuation of motor 24, the member 32 is also rotated. The circular base portion 33 does not rotate nor does the housing 8 rotate. The contact 42 extending rearwardly of the assembly wipes or engages the resistance element 36 of potentiometer 37. As the assembly 12 is rotated, as heretofore set forth, the member 32 is also rotated so that contact 42 travels along resistance element 36. Since the structure embodies rotating and non-rotating portions, some means must be provided to complete electrical connections between the photoelectric cell 22 and the conductors leading to and housed within the adaptor 45, Figure 2. Hence, the functions of the contact rings 40 and 41 are clear. To contact ring 40 there is secured the conductor leading from one of the contacts on cell 22 which conductor passes through bore 44 in members 15 and 32. To contact ring 41 there is secured another conductor leading from another contact on cell 22 which conductor passes through another bore 44 (not visible in Figure 2) in members 15 and 32. To complete a circuit, a sliding contact 40' secured to the end of a conductor is adapted to slide upon or wipe contact ring 40. Likewise a sliding contact 41' secured to the end of a second conductor is adapted to slide upon or wipe contact ring 41. The conductor whose wiper contacts ring 40 is shown in the upper portion of Figure 2 and passes through bore 46. The conductor whose wiper contacts ring 41 likewise passes through another bore 46, but it is hidden from view in Figure 2. Hence the conductors referred to provide a continuous electrical path because of the wiping contacts with contact rings 40 and 41.

As seen in Fig. 1, a drive tape 50 extends about the unit 7 and the aperture adjusting ring 6 of lens tube 5. The drive tape 50 is preferably part of a drive tape assembly of the improved type described and claimed in my copending application, Serial Number 589,626, Motion Transmitting Devices, filed concurrently herewith and now Patent 2,835,135, May 20, 1958. The drive tape and the mechanism for locking and adjusting the same is not claimed herein, but forms the basis of the copending application. Thus, as seen in Fig. 6, the tape 50 is disposed in the general form of a spiral with the inner convolutions of the spiral embracing sleeve 16 of rotatable assembly 12, and the outer convolution of the spiral extending about aperture adjusting ring 6, the latter being provided with a pin 6a engaging a hole in the tape. The tape is provided with suitable means for adjusting the overall length of the tape.

By sliding the tape assembly relative to rotatable assembly 12, in rotation, the outermost convolution of the spiral may be made larger or smaller to adjust to different circumferences of aperture adjusting rings presented by the various interchangeable lens tubes ordinarily employed in combination with the camera.

Referring now to Fig. 7, it will be seen that the electrical system employed in this embodiment of the invention includes a direct current source 60, across which is connected the series combination of the resistance element of potentiometer 37 and an adjustable resistance 61. One terminal of photoelectric cell 22 is connected via conductor 62 to one terminal of the actuating coil 63 of a D'Arsonval meter movement type relay 64, the other terminal of coil 63 being connected to one terminal of a fixed resistance 65. Such terminal of resistance 65 is also connected, through an adjustable resistance 66, to the slider 42 of potentiometer 37. The other terminal of cell 22 is connected via conductor 67 to the remaining terminal of resistance 65, thence to the negative terminal of current source 60. Resistance 66 is large with respect to potentiometer 37 and resistances 61 and 65.

Thus, there is no potential difference across coil 63 when the voltage drop across resistance 65 is equal to the output voltage of the photoelectric cell 22. For a given voltage of source 60, the voltage drop across resistance 65 depends upon the adjustment of potentiometer 37 and resistances 61 and 66. When the output voltage of cell 22 exceeds the voltage drop across resistance 65, current flows through 63 in a direction to cause the relay 64 to actuate in one direction. When the voltage drop across resistance 65 exceeds the output voltage of cell 22, current will flow through coil 63 in the opposite sense, causing the relay 64 to be actuated in the other direction.

The D'Arsonval relay 64 is employed to connect motor 24 to current source 60, selectively for forward or reverse operation of the motor in accordance with whether the output voltage of cell 22 or the voltage drop across resistance 65 predominates. Such connection is accomplished by selective actuation of power relays 68 and 69. Normally closed contacts 70 and 71, respectively, of power relays 68 and 69 are both connected via conductor 72 to the positive terminal of current source 60. Movable contact 73 of relay 68 is connected via conductor 74 to one terminal of motor 24, while movable contact 75 of relay 69 is connected to the other terminal of the motor via conductor 76. Normally open contacts 77 and 78 of relays 68 and 69, respectively, are connected to conductor 79, thence to conductor 67 and thus to the negative terminal of current source 60. Thus, if relay 68 is energized, engaging contacts 73 and 74, terminal 80 of motor 24 is connected to the negative side of the current source, while terminal 81 remains connected to the positive side of the source via the normally closed contact 71 of relay 69. If, on the other hand, relay 69 is energized to engage contact 75 with contact 71, terminal 81 of motor 24 is connected to the negative side of the current source, terminal 80 remaining connected to the positive side via normally closed contact 70 of relay 68.

Movable contact 82 of D'Arsonval relay 64 is connected via conductors 83 and 72 to the positive side of current source 60. Fixed contact 84 of relay 64 is connected via conductor 85 to one terminal of actuating coil 86 of relay 68, the other terminal of coil 86 being connected by conductors 87, 79 and 67 to the negative side of source 60. Fixed contact 88 of relay 64 is connected via conductor 89 to one terminal of actuating coil 90 of relay 69, the other terminal of coil 90 being connected via conductors 91, 79 and 67 to the negative side of source 60. Thus, actuation of D'Arsonval relay 64 serves to selectively connect the actuating coils of power relays 68, 69 across the current source 60.

Connected between one end of D'Arsonval meter coil 63 and movable contact 73 of relay 68 is a fixed condenser 92. Similarly, a fixed condenser 93 is connected between the other end of coil 63 and movable contact 75 of relay 69. Thus, condensers 92 and 93 are normally charged by direct current source 60 and are discharged through coil 63 of D'Arsonval relay 64 whenever the corresponding power relay is energized by actuation of the D'Arsonval relay. The condensers 92 and 93 are provided in this manner to supply to coil 63 an additional, aiding pulse of current, substantially at the time movable contact 82 engages one of the contacts 84, 88, so that the D'Arsonval relay will have no material tendency toward contact chatter or bounce.

Resistance 66 serves to vary the sensitivity of the control circuit. Adjustment of resistance 66 changes the amount of rotation of rotatable assembly 12 which will result from a given difference between the voltage drop across resistance 65 and the output voltage of photoelectric cell 22. Accordingly, the resistance 66 allows the device to be adjusted to compensate for the different sizes of aperture adjusting rings encountered when employing several interchangeable lens tubes. To provide for ready adjustment of resistance 66, the resistance is provided with a suitable manual adjusting knob 94, Fig. 1.

Resistance 61 also serves to vary the sensitivity of the control circuit, but has a relatively smaller effect than resistance 66. The purpose of resistance 61 is to provide means for making relatively small adjustments to compensate for light intensity differences within the scene being photographed, as hereinafter explained. For ready adjustment, resistance 61 is provided with an adjusting knob 95, Fig. 1.

A manual on-off switch 96, Fig. 7, is provided in series with the current source 60. For simplicity, the movable contact of switch 96 may be mechanically connected to the shaft of adjusting knob 95, so that initial movement of knob 95 closes switch 96.

From Figs. 2–5, it will be noted that assembly 7 includes some of the electrical components of the device, namely, photoelectric cell 22, motor 24 and potentiometer 37. The remaining electrical components, including D'Arsonval relay 64, power relays 68 and 69, current source 60 and resistances 61, 65 and 66, are mounted in a casing 97, Fig. 1, attached to the camera 1. The electrical conductors serving to connect the electrical components in casing 97 with those in assembly 7 are provided in a single cable 98, Fig. 1, terminating on the one hand at adaptor 99 and, on the other, at adaptor 45, Fig. 2.

Overall operation of this embodiment of the invention is as follows: Assume resistances 61 and 66 have a definite adjustment and that the slider 42 of potentiometer 37 is at some unknown position. Manual switch 96 is closed. Motor 24 is actuated to adjust potentiometer 37 to a value such that the voltage drop across resistance 65 is just equal to the output voltage of photoelectric cell 22 for the particular intensity of light which happens to be impinging upon the cell. When motor 24 ceases to run, switch 96 is opened.

Drive tape 50 is now loosened on assembly 12 by pivoting lever 56 to flatten spring 55. The camera is pointed at a light source of known value. Switch 96 is then closed. Motor 24 then runs until potentiometer 37 is adjusted in accordance with the new output voltage of photoelectric cell 22. The tape 50 still being slack with respect to assembly 12, the aperture adjusting ring 6 is now rotated to give an iris opening matching the known light value to which the device is exposed. Lever 56 is now pivoted to release spring 55, again locking the tape 50 on assembly 12.

Another light source of a known greater intensity is now chosen, the light value being such as to require a definite, smaller aperture. With tape 50 locked in driving relation and switch 96 closed, the camera is directed toward this stronger light source, with the result that motor 24 operates to rotate assembly 12 in a direction to give the desired new adjustment of aperture ring 6. When motor 24 ceases to run, the resulting aperture adjustment is checked to see if the proper smaller aperture setting has been obtained. If the aperture adjustment obtained is not correct, a compensating adjustment is made on resistance 66 and the procedure repeated until the aperture ring 6 is at the proper position when the motor 24 stops. The device has now been properly calibrated and ready for actual use in photography.

When, during use, it is necessary to replace lens tube 5 by another lens tube having an aperture ring of different size, tape lock assembly 52 is released and the convolutions of tape 50 embracing assembly 12 are adjusted in rotation so that the size of the outer convolution of the tape is increased or decreased to accommodate the new aperture ring. Resistance 66 is now adjusted to compensate for the new relationship between the circumferences of assembly 12 and the aperture ring.

When it is desired to photograph a scene in which the illumination of the primary subject varies markedly from that of the background, the output voltage of the photoelectric cell 22 will not be such as to give an aperture adjustment which is precisely correct for a proper exposure of the primary subject. To compensate for this effect, the operator simply adjusts resistance 61 to vary the sensitivity of the control circuit in a sense to increase or decrease, as the case may be, the amount of rotary motion imparted to assembly 12 in response to a given change in light level.

In considering the operation of the photoelectrically controlled system of this invention, it is to be understood that photoelectric cells are commercially available which have a logarithmic response for the range of light variations involved.

Figure 8:
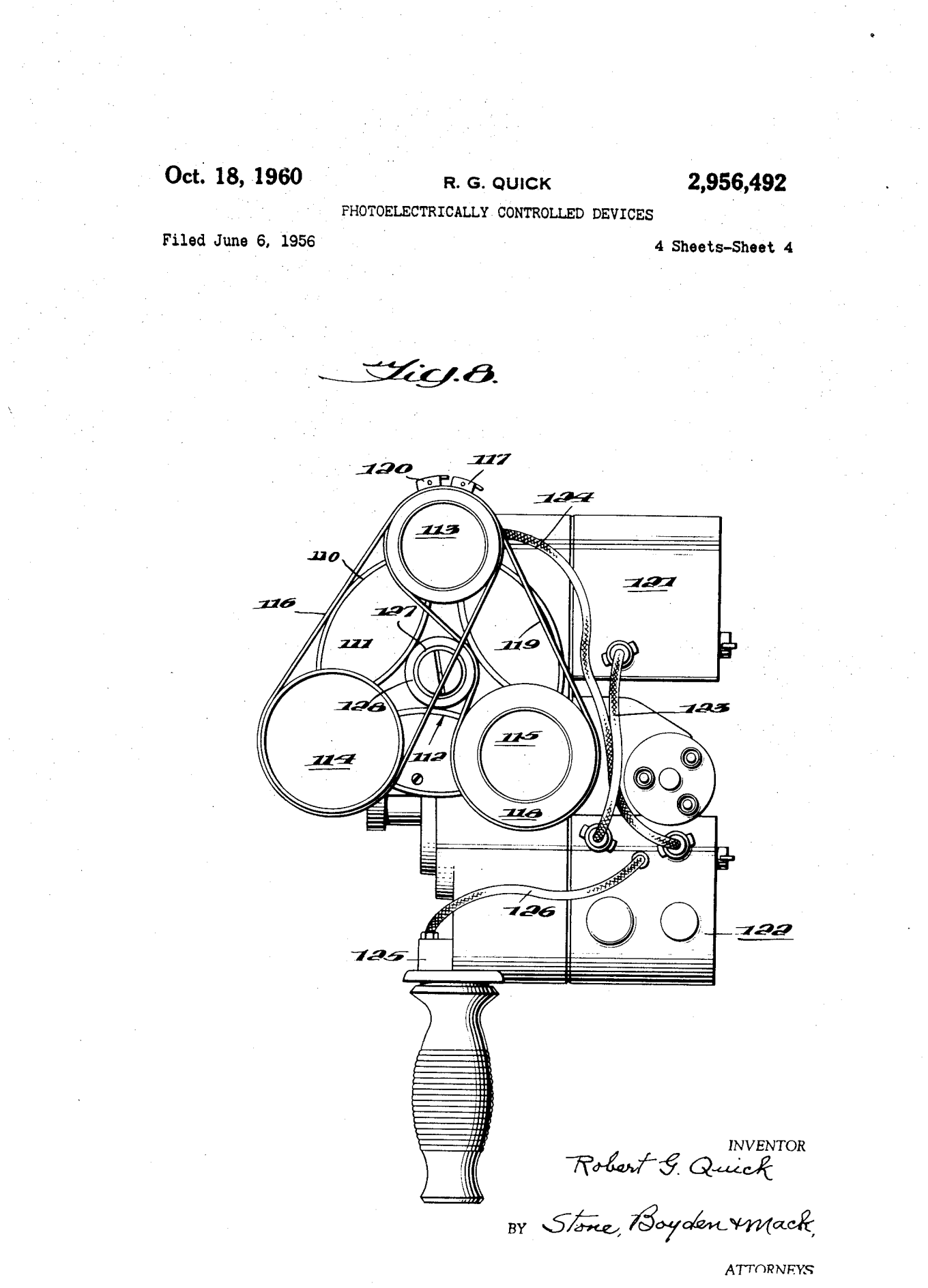

Fig. 8 illustrates the invention as applied to a conventional motion picture camera having a housing 110, a circular, front plate 111 and, rotatably mounted on front plate 111, a turret 112 comprising three lens mounts each carried by a different one of the turret arms. Mounted on one lens mount is an assembly 113 identical with assembly 7, Figs. 1–5. Mounted on one of the other lens mounts is a lens tube 114, while a lens tube 115 is mounted on the remaining lens mount. A drive tape assembly identical to that described with reference to Fig. 6, including drive tape 116 and tape lock assembly 117, extends in driving relation about rotatable assembly 113 and the aperture adjusting ring of lens tube 114. Lens tube 115, and its aperture adjusting ring, are smaller in diameter than lens tube 114. In order to bring the diameters of assembly 13 and the aperture adjusting ring of lens tube 115 to the proper ratio, determined by the characteristics of the lens and iris mechanism involved, an adaptor ring 118 is provided, embracing the aperture adjusting ring of lens tube 115 and locked thereto in any suitable manner, as by a friction fit. A drive tape assembly, again identical with that described with reference to Fig. 6 and including tape 119 and tape lock assembly 120, extends in driving relation about assembly 113 and adaptor ring 118.

The rotatable assembly 113 is in all respects like assembly 7 and includes a driving motor, a control potentiometer and a photoelectric cell. The motor and photoelectric cell are again interconnected according to the circuit of Fig. 7.

Mounted on the camera housing 110 are casings 121 and 122, the former enclosing batteries constituting the necessary direct current source, the latter enclosing the D'Arsonval relay, the power relays and the resistances described with reference to Fig. 7. Electrical connections between the components in casings 121 and 122 and assembly 113 are provided by insulated cables 123 and 124. The manual on-off switch is mounted at 125 and connected in the control circuit by insulated conductor 126.

Operation of the device of Fig. 8 is in all respects like that of Figs. 1-7, except that rotation of assembly 113 effects, through tapes 116 and 119, respectively, simultaneous adjustment of the aperture rings of lens tubes 114 and 115 in accordance with light changes sensed by the photoelectrtic cell of assembly 113.

It will be noted that, because of the relative positions of assembly 113, lens tube 115 and the mounting nut 127 for the front plate 111, the driving tape 119 must bypass the mounting nut 127. For this reason, an adaptor sleeve 128 is rotatably mounted on nut 127, with the tape 119 engaging the periphery of the sleeve 128, as shown.

I claim:
1. In combination with a camera having a lens mount, a housing having a cylindrical tip, means mounting said housing on the camera adjacent said lens mount with said tip extending forwardly, a cylindrical rotatable assembly including at one end a tubular cylindrical sleeve rotatably embracing the cylindrical tip of said housing, rotary electrical power means mounted in said housing and having an output shaft coaxial with said cylindrical tip, means connecting said rotatable assembly to said power shaft for rotation thereby, a photosensitive device mounted at the other end of said rotatable assembly in a position to be exposed to the scene viewed by the camera, electrical means interconnecting said photosensitive device and said power means to actuate the latter in response to energization of said photosensitive device, a lens tube mounted on said lens mount and having a rotatable aperture adjusting ring, and a drive tape assembly operatively interconnecting said rotatable assembly and said aperture adjusting ring, said tape assembly comprising the combination of a substantiallyy non-extensible drive tape disposed in the form of a plurality of convolutions of a spiral with the end of the tape inwardly of the spiral being attached to the body of the tape, a means having dimensions which are small with respect to the length of the tape, the other end of said tape being connected to said means, whereby said tape and member form a drive tape assembly one convolution of which extends about both said rotatable assembly and said aperture adjusting ring while other convolutions encircle only one such member, said means connecting said other end of the tape to a selected portion of one of the said other convolutions of the tape to tighten and slacken the tape, respectively, when the tape assembly is disposed on said rotatable assembly and said aperture adjusting ring.

2. In combination with a camera having a turret providing three lens mounts, a pair of lens tubes each having an aperture adjusting ring, said lens tubes being mounted each on a different one of said lens mounts with said rings lying in different planes, a housing mounted on the remaining one of said lens mounts, rotatable means mounted on said housing for rotation about an axis parallel to said lens tubes, a photosensitive device carried by said rotatable means in such position as to be exposed to the scene viewed through said lens tubes, an electric motor mounted in said housing, means mechanically connecting said motor to drive said rotatable means, a drive tape extending about said rotatable means and the aperture adjusting ring of one of said lens tubes, a second drive tape extending about said rotatable means and the aperture adjusting ring of the other of said lens tubes, whereby rotation of said rotatable means by said motor results in simultaneous adjustment of said aperture adjusting rings, and electrical means interconnecting said photosensitive device and said motor to actuate the lattere in repsonse to energization of the photosensitive device.

References Cited in the file of this patent
UNITED STATES PATENTS

| | | |
|---|---|---|
| 2,091,881 | Riszdorfer | Aug. 31, 1937 |
| 2,209,639 | Tonnies | July 30, 1940 |
| 2,342,876 | McWilliams | Feb. 29, 1944 |
| 2,655,086 | Walker | Oct. 13, 1953 |
| 2,683,402 | Bruck | July 13, 1954 |